United States Patent
Faulkner et al.

(10) Patent No.: US 11,100,257 B2
(45) Date of Patent: Aug. 24, 2021

(54) SPOOL RUN ROUTE FINDING IN CAD SYSTEMS

(71) Applicant: Applied Software Technology, Inc., Atlanta, GA (US)

(72) Inventors: Jason Faulkner, Atlanta, GA (US); Xiao Chun Yao, Marietta, GA (US)

(73) Assignee: Applied Software Technology, Inc., Atlanta, GA (US)

( * ) Notice: Subject to any disclaimer, the term of this patent is extended or adjusted under 35 U.S.C. 154(b) by 0 days.

(21) Appl. No.: 16/853,366

(22) Filed: Apr. 20, 2020

(65) Prior Publication Data
US 2020/0334388 A1     Oct. 22, 2020

Related U.S. Application Data

(60) Provisional application No. 62/835,687, filed on Apr. 18, 2019.

(51) Int. Cl.
*G06F 30/12*     (2020.01)
*G06F 3/0482*    (2013.01)

(52) U.S. Cl.
CPC ............ *G06F 30/12* (2020.01); *G06F 3/0482* (2013.01)

(58) Field of Classification Search
CPC ........ G06F 30/12; G06F 3/0482; G06F 30/00; G06F 30/30482
USPC ......................................................... 703/7, 6
See application file for complete search history.

(56) References Cited

U.S. PATENT DOCUMENTS

| | | |
|---|---|---|
| 7,039,569 B1 | 5/2006 | Haws |
| 7,856,342 B1 | 12/2010 | Kfouri |
| 8,762,877 B2 | 6/2014 | Loberg |
| 9,262,863 B2 | 2/2016 | Yadav |
| 10,325,035 B2 | 6/2019 | Kelly |
| 2008/0275674 A1 | 11/2008 | Reghetti |
| 2010/0318929 A1 | 12/2010 | Hilton |
| 2011/0251975 A1 | 10/2011 | Evans |
| 2013/0132040 A1 | 5/2013 | Shook |
| 2014/0164072 A1* | 6/2014 | Kulusjarvi ............. G06Q 10/10 705/7.39 |
| 2015/0029181 A1 | 1/2015 | Lerey |

(Continued)

OTHER PUBLICATIONS

Agapaki, Eva, Graham Miatt, and Ioannis Brilakis. "Prioritizing object types for modelling existing industrial facilities." Automation in Construction 96 (2018): 211-223.*

(Continued)

*Primary Examiner* — Cedric Johnson
(74) *Attorney, Agent, or Firm* — Clayton, McKay & Bailey, PC

(57) ABSTRACT

A system can receive selection of endpoints for a spool on a graphical user interface ("GUI") and attempt to assemble a spool based on the endpoints. To do so, a plugin can execute a route-finding process that traverses routes from the endpoints. The routes can be determined by retrieving connectors from the endpoints and, for each connector, determining what parts are connected. For each connected part, the process can repeat so long as the connected part is not one of the endpoints or already in another route or spool. When the routes are complete, the connected parts can be treated as an assembly of the spool. The GUI can generate a spool sheet that uses the assembly as the spool.

20 Claims, 6 Drawing Sheets

(56) References Cited

U.S. PATENT DOCUMENTS

| | | | |
|---|---|---|---|
| 2015/0135793 A1* | 5/2015 | Plummer | B21D 7/021 |
| | | | 72/311 |
| 2015/0142157 A1* | 5/2015 | Daugherty | C07K 14/4753 |
| | | | 700/114 |
| 2018/0247002 A1 | 8/2018 | Mendez | |
| 2019/0042669 A1* | 2/2019 | De Backer | G06T 7/70 |
| 2019/0370419 A1 | 12/2019 | Ronson | |

OTHER PUBLICATIONS

Autodesk® Revit® 2015 Getting Started Guide.*
Li, Xiaodan, Zhongfu Li, and Guangdong Wu. "Modular and Offsite Construction of Piping: Current Barriers and Route." Applied Sciences 7.6 (2017): 547.*
Revit Architecture User's Guide. 2011.*
Son, Hyojoo, Frédéric Bosché, and Changwan Kim. "As-built data acquisition and its use in production monitoring and automated layout of civil infrastructure: A survey." Advanced Engineering Informatics 29.2 (2015): 172-183.*
Victaulic Tools for Revit®. Revit 2014, 2015, and 2016.*
Palmer, Mark E. et al., "3D Piping IGES Application Protocol Version 1.0", Feb. 24, 1993, National Institute of Standards and Technology, U.S. Department of Commerce. (Year: 1993).*
"Autodesk, Inc.", "Revit Structure 2011 User's Guide". Apr. 2010. 1812 pages. pp. 36, 587, 684, 771-774. 789, 887-888, 966, 977-983, 1004, 1011, 1633-1634, 1643.

* cited by examiner

FIG. 3B

SPOOL BOM — 340

| # | QTY | SIZE | DESCRIPTION | MATERIAL | LENGTH |
|---|---|---|---|---|---|
| 79 | 1 | 1-1/2"x1-1/2"x3/4" | NoWT - 600 - Tee (Red-C) | Copper | 0' - 0 7/8" |
| 78 | 1 | 3/4" | NoWE - 500 - Elbow 90(C) | Copper | |
| 84 | 1 | 1-1/2" | NoWE - 500 - Elbow 90(C) | Copper | |
| 579 | 1 | 1-1/2" | Type L Copper Pipe | Copper | 3' - 11 9/32" |
| 578 | 1 | 3/4" | Type L Copper Pipe | Copper | 0' - 7 9/16" |
| 582 | 1 | 3/4" | Type L Copper Pipe | Copper | 8' - 8 1/8" |
| 577 | 1 | 1-1/2" | Type L Copper Pipe | Copper | 4' - 10 11/16" |
| 575 | 1 | 1-1/2" | Type L Copper Pipe | Copper | 29' - 6 15/32" |

SPOOL WELDS — 342

| WELD NO | SIZE | WELDER NAME | WELDER ID | WELDER SIGNATURE |
|---|---|---|---|---|

SPOOL RUN ROUTE FINDING IN CAD SYSTEMS

CROSS-REFERENCE TO RELATED APPLICATION

This application claims the benefit of and priority to U.S. Provisional Application No. 62/835,687, filed on Apr. 18, 2019, titled "Spool Run Route Finding in CAD Systems," the contents of which are hereby incorporated herein by reference in their entirety.

BACKGROUND

Computer-aided design ("CAD") software allows users to design structures for construction, among other things. One type of CAD software is Building Information Modeling ("BIM") software, which allows users to elaborately design three-dimensional structures. AUTODESK REVIT is one type of BIM software that can be used to design complex buildings all the way down to components and assemblies for use in a project. For example, a user can model an entire plumbing or electrical installation within a building. Often, part assemblies are defined in spools that allow for on-site assembly.

A spool run can be a continuous path of connected components between all endpoints of the assembly. It can be comprised of fabrication parts. However, the current process requires that the user manually select these components. The user can do so by individually clicking each part or drawing a box around all parts to be included.

The current approach to selecting items for a spool run is problematic for several reasons. For one, the process is time consuming and prone to error. The user often will miss selecting a part without noticing, especially in assemblies with many parts. Individually selecting parts is very difficult or impossible for zero length parts, such as welds, or other very small parts that need to be included. In addition, selecting multiple parts with a selection box can cause the selection to include parts that are not part of the continuous run. For example, parts above or below the desired parts can be incorrectly included in the spool run.

Additionally, using a CAD program, such as REVIT, the process of creating a spool is overly step intensive. The user must go through a series of steps involving navigating to a toolbar ribbon, invoking a button, and entering the desired number in a dialog before they can select the parts. When generating a large number of spools at one time, this can be quite time consuming and dramatically interrupt user workflow.

For at least these reasons, a need exists for systems that can determine spool routes in CAD systems.

SUMMARY

The examples described herein specifically address technical problems and limitations of REVIT and similar BIM software. The examples include a plugin that can determine the parts in a spool based on route finding between connected parts. This allows users who are already invested in particular CAD software to efficiently and accurately create spool sheets for part assemblies.

In one example, the system executes a plugin to cause the CAD GUI to perform a more streamlined approach. For example, a user can invoke functionality to create a spool run by selecting a button in the toolbar. The user can be prompted to enter the starting spool number (for example "SPL-04"). The user is then prompted to select all the endpoint parts. This could be 2 or more parts depending on the "shape" of the spool being constructed. For example, the assembly could include connected conduit or pipes spanning two or more directions. These prompts can be generated graphically on the GUI based on the plugin. Alternatively, the GUI itself can be programmed for this functionality.

Next, user selected endpoint parts are connected using logic provided in the plugin. In an example, the plugin searches for a path from a first of the user selected endpoint parts to any other defined endpoint part. A part can have one or more connectors. For example, a cap can have only one connector, whereas a straight or elbow has two connectors, a tee or wye as three connectors, and so on.

For every connector that has not already been processed in the route, the next part can be determined. The plugin can request a next part for a connecter using an application programming interface ("API") call to the BIM software, in an example. The route can expand in multiple directions based on how many connectors a part has. For example, if the part has two connectors, there can be two next parts. The route-finding traversal can be started in both directions, one for each connector. If a part has already been processed, either in the current traversal or is already included in a defined spool, it is not "doubled back" on. The current route can end. If none of the next parts in any of the traversals are an endpoint, then each traversal processes its next part. This repeats until an endpoint part is found.

If the next part of any traversal connects to any endpoint, then a route is established. When this happens, all parts included in the traversal that established the route are included as endpoint parts. In other words, any future routes that encounter any of these parts can be considered connected by the plugin. This is because the plugin has already determined they lead back to one of the user defined endpoint parts.

The plugin can search for connections to any user-selected endpoint parts that are not yet included in the cumulative list of connected parts. In the event there is no continuous path between endpoint parts then the plugin can highlight the endpoints as not included in the assembly. This can be an error condition indicating that the endpoints are not actually connected. The user can then reevaluate the assembly before attempting to create a spool. The user can still create the spool without the unconnected endpoints in an example. In one example, the plugin can cause the GUI to highlight one or more last parts that connect to the endpoints but from which no path can be found. In one example, the assembly highlights one color and non-connected parts highlight another color.

Once all the routes have run or user-selected parts are connected, the collective of parts used to create the connection of all user selected parts can be spooled. This can include assembling the parts with the number previously defined (for example, "SPL-04") assigned as the name. The next spool number can be incremented by looking at numeric characters as the end of the previous name value and then incrementing this by one (for example, "SPL-05"). If this number is already in use then the number is continuously incremented by one until a value not in use is found.

In one example where spools can be built upon, the user can be prompted to select the next endpoint part(s). It is possible this could be one or more parts. One part can be provided because the selected part can be connected to any parts previously included in a spool to create a continuous connection with respect to what has previously been spooled. The plugin can connect the parts. The parts included in the newly generated spool can then be added to the collective of spool parts with each of these parts becoming candidates for endpoints for future spools. The process can continue until the user stops the operation, in an example.

The method can be performed by a system in an example. The method can also be implemented based on code stored on a non-transitory, computer-readable medium, which is read and executed by a process of a computing device. While a plugin is referred to in several examples, the same functionality can be built into the application that uses the plugin in those examples.

BRIEF DESCRIPTION OF THE DRAWINGS

FIG. 3B is an example illustration of a build of materials ("BOM") based on the route finding.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An example system can incorporate a plugin that determines parts included in a spool. The plugin can provide a button to begin automatic spool route finding. The user can define endpoints for a spool, such as by selecting them on a GUI. The plugin can then attempt to find routes between all the endpoints until the endpoints are all connected or no more routes exist. Then the resulting spool can be highlighted and merged into an assembly. The assembly can be printed on a spool sheet and reusable as a BIM-compatible assembly, in an example.

Figure 1:
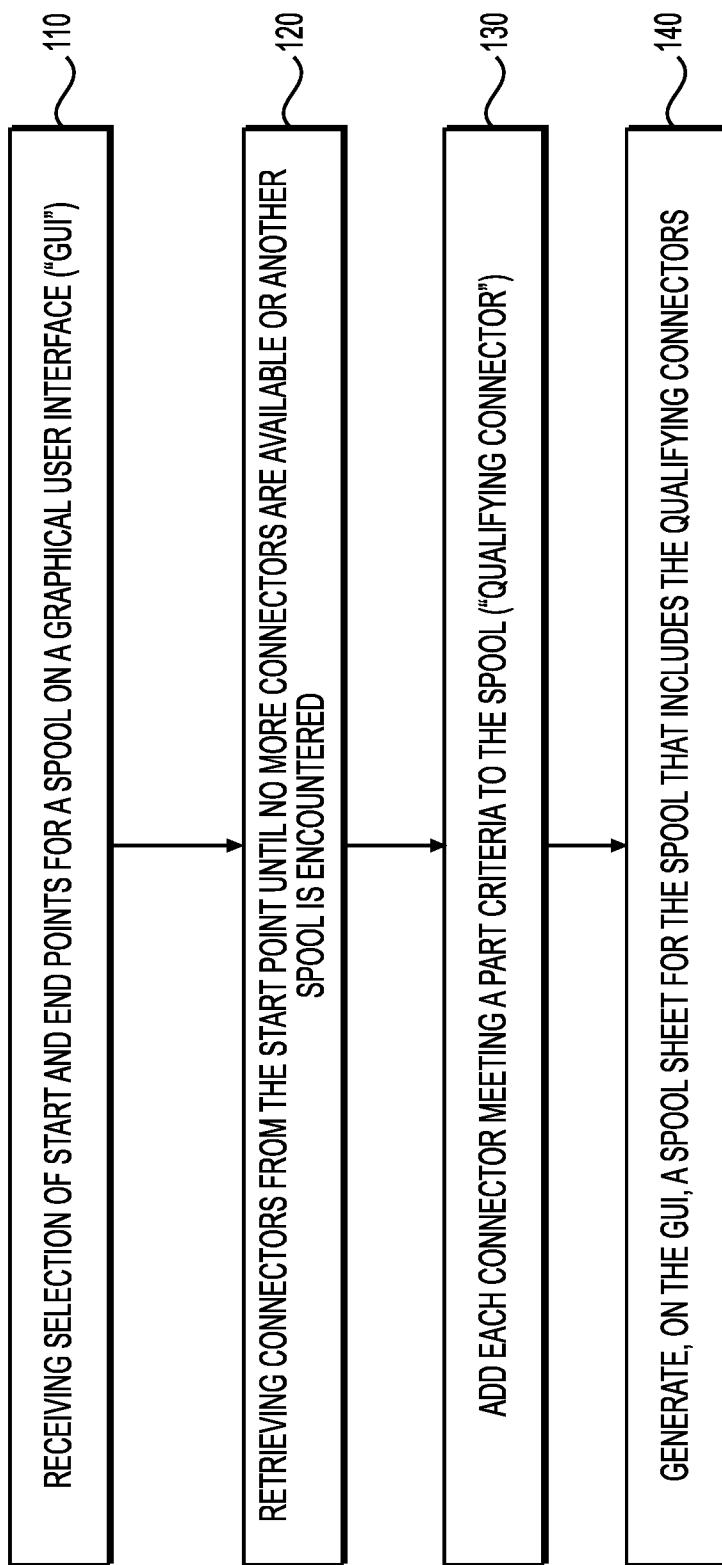
FIG. 1 is an example flowchart for performing spool run finding in a CAD system.

FIG. 1 is an example flowchart for performing spool run finding in a CAD system. At stage 110, a GUI can receive selection of endpoints for a spool.

The endpoints can act as both starting and ending points for the route-finding process, as will be described.

At stage 120, the plugin can perform a loop or recursion that attempts to find routes between the endpoints. This can include retrieving connectors from the starting point (i.e., from each selected endpoint, initially) until no more connectors are available or another spool is encountered. To do this, for each endpoint the plugin can retrieve connectors. The plugin can make an API call to the CAD application to retrieve the connectors for a particular part, starting with an endpoint, in an example.

In one example, the plugin causes the GUI to generate a button for determining a spool. When selected, the GUI can prompt the user to selected endpoints. These can be selected by clicking two or more individual parts in the GUI, in an example. Alternatively, the user can use a selection box to select multiple parts to treat as endpoints. The user can attempt to select an entire assembly with the selection box, in an example. Once the user has selected the endpoints, the user can hit a GUI button or input a keyboard command to cause the plugin to begin the route-finding process for building the spool.

The plugin can run a route-finding process that traverses routes from the endpoints. The route-finding process can begin by retrieving connectors from the endpoints. In one example, the routes can be determined by iteratively checking parts that are connected to connectors. A connector can be a property of a part. For example, the endpoint can be a pipe with connectors on two ends. A tee can have three connectors. A cap can have a single connector.

For each connector of a selected endpoint, the plugin can determine what parts are connected. To do this, the plugin can make an API call to the CAD application for a connector. The API call can cause the plugin to receive one or more parts that are connected to the connector. The plugin can maintain a tree of nodes as it traverses paths, which may branch into additional baths based on how many connectors each part has. Alternatively, the process can simply recurse each time a new connected part is identified.

Determining which parts are connected to a connector can involve more than just receiving a connected part in response to an API call. In one example, the plugin can also determine if the received part meets part criteria. Part criteria can be established for certain types of spools (i.e., assemblies). Assembly types can have whitelists or blacklists of part types to avoid including parts that are not actually part of an assembly. For example, an electrical assembly can have a whitelist of parts, such as conduit, tees, and others, that are part of the assembly. In one example, only fabrication parts (i.e., not generic parts) are allowed as part criteria.

The plugin can determine whether a part meets the part criteria. If it does not, the part can be treated as a non-connected part. Alternatively, the connected part can be treated as part of another spool. Either way, the respective route can end and the part can be omitted from addition to the assembly.

When the connected part is one of the endpoints or has no connectors, the plugin can also end the respective route. So long as the part has already not been processed in another route, it can be included in the currently ended route.

On the other hand, when a connected part is not one of the endpoints or already in another route, the iterative process can continue. The plugin can retrieve connectors of the connected part. These can already be included with the part information, or an API call can reveal the connectors. Then the plugin can retrieve the one or more parts connected to that connector and determine whether they are already part of another route or are an endpoint. Alternatively, if the part has no more connectors and is not an endpoint or is part of another spool, the route can end with a disconnection.

In general, the plugin can traverse a list of connectors until there are no more connectors. If no endpoint is reached down one path, the process can begin again from where there was an endpoint.

At stage 130, the connected parts can be added to an assembly. This can occur as routes end, in an example. An assembly can be formed when at least two endpoints have routes that connect with one another.

The GUI can display the assembly by highlighting the parts that it was able to connect. The GUI can likewise indicate disconnections. If an endpoint is not able to connect to another endpoint, the endpoint can be highlighted a different color. In one example, the entire disconnected route from the disconnected endpoint is highlighted to assist the user in determining where an unintended disconnection may be located.

The GUI an also prompt the user to identify more endpoints if the user would like to add to the assembly. Doing so can cause the plugin to attempt to form more routes from the newly added endpoint to the existing parts of the assembly, which can all be treated as endpoints.

At stage 140, the GUI can generate a spool sheet that includes the assembly as the spool. The spool sheet can be generated according to instructions from the plugin, in an example. The plugin can omit some part types, such as welds, that do not need to be visualized or included in a BOM list. Whitelists and blacklists for assembly types can be used to ascertain which parts of the assembly to include in the spool sheet and BOM list.

Figure 2:
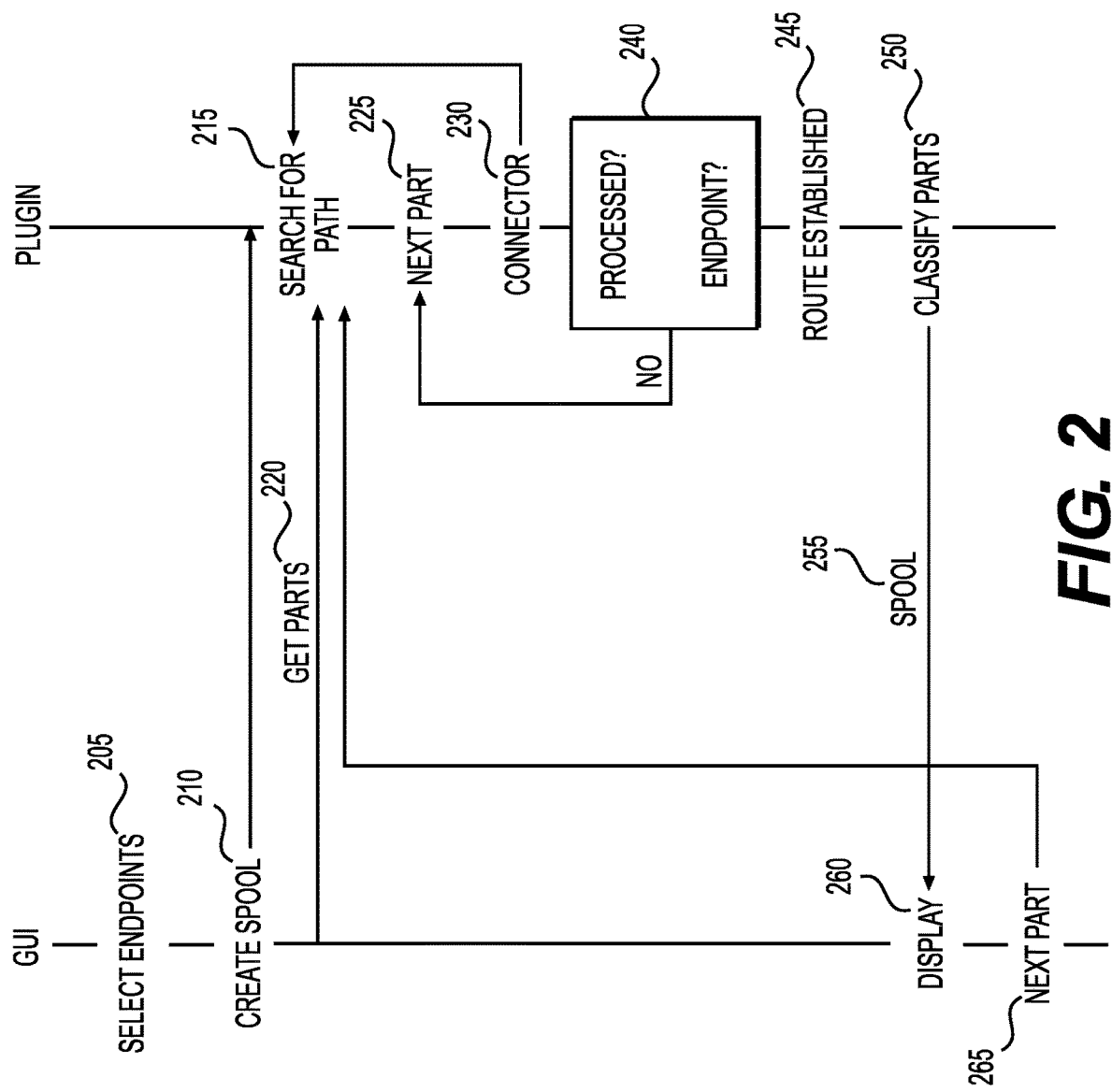
FIG. 2 is an example sequence diagram for performing spool run finding in a CAD system.

FIG. 2 is an example sequence diagram for performing spool run finding in a CAD system. At stage 205, the user can be prompted to select endpoints. The user can click parts on a GUI that represent outside portions of an assembly, in an example. Alternatively, the user can select parts with a selection box. All of the selected parts can be treated as endpoints.

At stage 210, the user can select an option to create a spool. This option can be displayed in the form of a button or menu item and can be generated based on instructions from the plugin. Selecting the option can cause a route-finding function to execute in the plugin.

At stage 215, the plugin can search for paths from each endpoint. In one example, the plugin receives all the parts that are endpoints at stage 220. This can include sending part identifiers or additional information, such as part type and connectors, for each respective endpoint (part) from the CAD application to the plugin.

The plugin can loop through all of the existing endpoints and request parts at stage 225 that are connected to the respective connectors. Each part that is retuned can be analyzed to determine whether it is already part of an existing route (processed) or is one of the endpoints at stage 240. If not, then the plugin can retrieve connectors for each connected part at stage 230. Those connectors can be used to search for paths again at stage 215.

In this way, the process can iterate until a part is reached that either has no connectors, no qualifying parts connected to the connectors, is already part of a route, or is an existing endpoint. Qualifying parts can be based on whether the part meets part criteria and whether the part already belongs to another spool. For example, part criteria can specify that only fabrication parts are allowed, rather than generic parts that do not correspond to a fabrication part. This can ensure that the resulting spool is made up of actual parts that someone can purchase and use. The part criteria can also be used to limit parts to only those in a whitelist of part types available for a type of assembly. For example, a plumbing assembly may not include air ducts as part of the assembly. Likewise, if a part is already identified as belonging to another assembly, it can be treated as nonconnected even if it attaches to one of the parts in the spool being generated. This can help generate spools from assemblies that are already contextually connected to one another within a design layout of the GUI. Alternatively, part criteria can be checked as part of stage 250, during part classification.

When the end of a route is reached, at stage 245 the plugin can establish the route and include it within the assembly. Routes that do not connect between two endpoints can be instead isolated as not part of the assembly. Both types of routes can display in the GUI, highlighted differently to help the user quickly recognize what is and is not being included in the assembly.

At stage 250, the plugin can classify parts of the assembly based on part types. If there are part types that do not appear in a whitelist for the assembly type, the GUI can prompt the user regarding whether to keep those parts in the assembly. These parts can be highlighted a different color or can be presented in a list for the user to accept or decline as part of the assembly.

Then, at stage 255 the spool corresponding to the assembly can be created. The plugin can send the parts to display as graphics and to provide in a BOM list to the GUI. The GUI can then render a spool sheet and display it at stage 260.

In one example, the user can select an option to add parts to a spool (i.e., assembly) at stage 265. The GUI can prompt the user to select at least one endpoint. Upon doing so, the plugin can being a path search at stage 215 from the newly selected endpoint. For the purposes of adding to an assembly, the current parts of that assembly can all be treated as endpoints, in an example. Stages 215, 225, 230, 240, and 245 can continue as outlined above, this time to update the assembly in a case where a route from the new endpoint connects over to the assembly.

In one example, if an existing assembly is updated, the plugin can cause the GUI to prompt whether existing spool sheets should be updated to reflect the addition. For example, a water faucet assembly can be updated to include a piece of the faucet. The user can opt to update the assembly. Then the plugin can add the faucet piece to the assembly such that all existing spool sheets for the assembly will now show the assembly with the updated faucet piece.

Figure 3A:
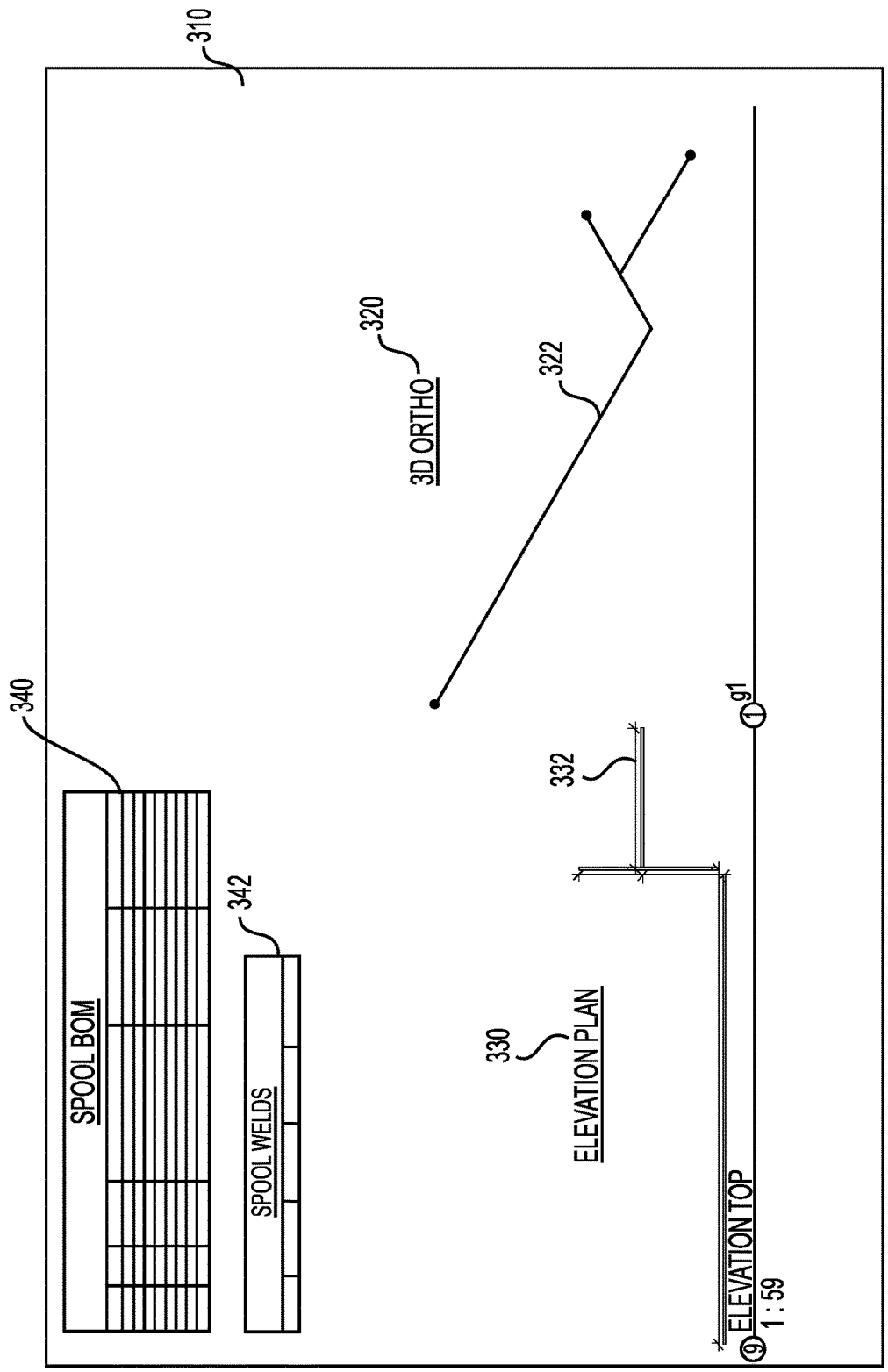
FIG. 3A is an example illustration of a GUI for creating a spool sheet based on the route finding.

FIG. 3A is an example illustration of a GUI for creating a spool sheet based on the route finding. A spool sheet region 310 can be the printable region of the spool sheet. In this example, the spool sheet region 310 includes a first view 322 and a second view 332 of the parts that were in the routes between endpoints, as determined by the plugin. These parts represent the assembly. The views 322, 332 can also include labels 320 and 330, respectively. The labels 320, 330 can describe the perspective shown by the respective view 322, 332 of the assembly.

The spool sheet region 310 can also include a Spool BOM 340. The Spool BOM can include the parts that the plugin identified for the assembly. The spool sheet region 310 can also include a list of omitted components 342. These can be parts that do not need to be purchased for the assembly and that are not displayed. This can allow the fabricator to better understand what they are looking at.

Outside the spool sheet region 310, a template can present other views in case the user would like the spool sheet to include views other than the default 320, 330. The user can drag one or more of these additional views onto the spool sheet region for easy modification of the printable spool sheet. The labels can be tied to the views, causing them to also drag with the views.

In one example, the user can print the spool sheet region 310. The views 352, 350 outside of the spool sheet region 310 can be omitted from printing, in an example. However, everything within the spool region 310 can be printed as the spool sheet, in an example.

FIG. 3B is an example illustration of a Spool BOM 340, which includes the list of components in the spool. As shown, the detail of the components can be sufficient for a fabricator to understand which components make up the assembly. In this example, the detail includes a part number (#), quantity (QTY), size of the part, and description of the part. The BOM list 340 also indicates the material that the part is made of and, where applicable, the length of the part.

The omitted component list 342 can list components that are not included in the Spool BOM but were technically selected by the user. The list can include blacklisted component types, such as welds. The columns can be based on the blacklisted component type. For example, the columns describing omitted welds can differ from the columns describing omitted nuts, bolts, or bends.

Figure 3C:
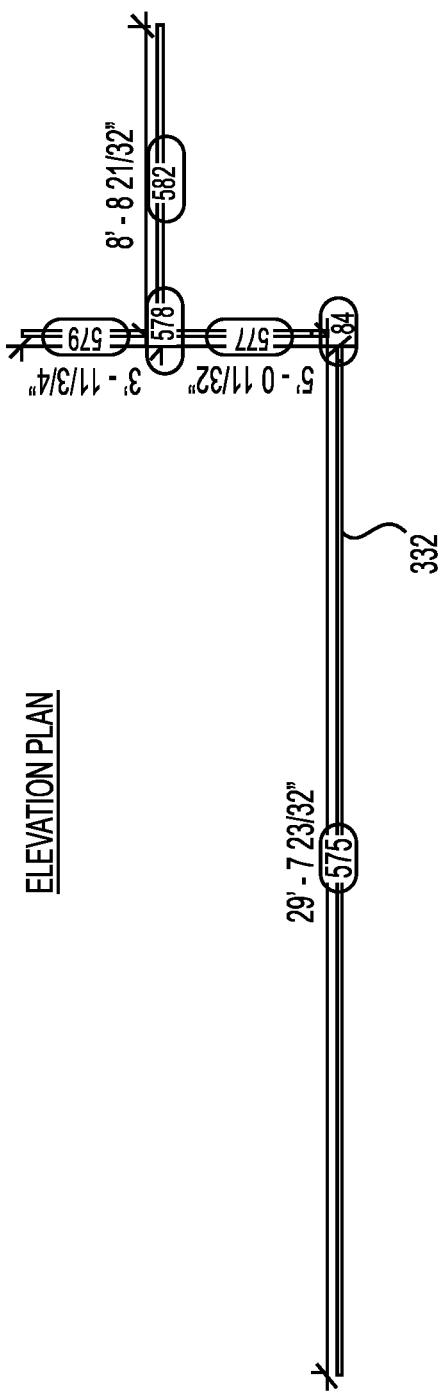
FIG. 3C is an example illustration of an assembly based on route finding by the plugin in one example.

FIG. 3C is an example illustration of an assembly based on route finding by the plugin in one example. View 232 from in the spool sheet region 310 is shown. As shown, the label 230 indicates this is an elevation plan view.

The assembly itself can comprise parts 575, 84, 557, 578, 579, and 582. These parts are all connected with routes spanning end points 575, 579, 582. These part numbers can correspond to the part numbers in the BOM list 340. In this example, the part numbers are shown in FIG. 3B, providing the fabricator with detail about each labelled part of the assembly.

Additionally, a spool sheet template can indicate that dimensions should be shown. The plugin can determine dimensions based on the part type, and display those in the view 232. In this example, length dimensions of each pipe 575, 557, 578, 579, and 582 are shown. However, the dimensions of elbow 84 are not shown. This can be because the template whitelists pipes for dimensions but not elbows. As a result, the dimensions are drawn for the pipes but not the elbow.

In one example, the spool sheet template can be set to activate certain parameters, such as part numbers and dimensions, when the anchor node is within the printable spool region 310. This can allow the spool page to remain less cluttered with information.

Figure 4:
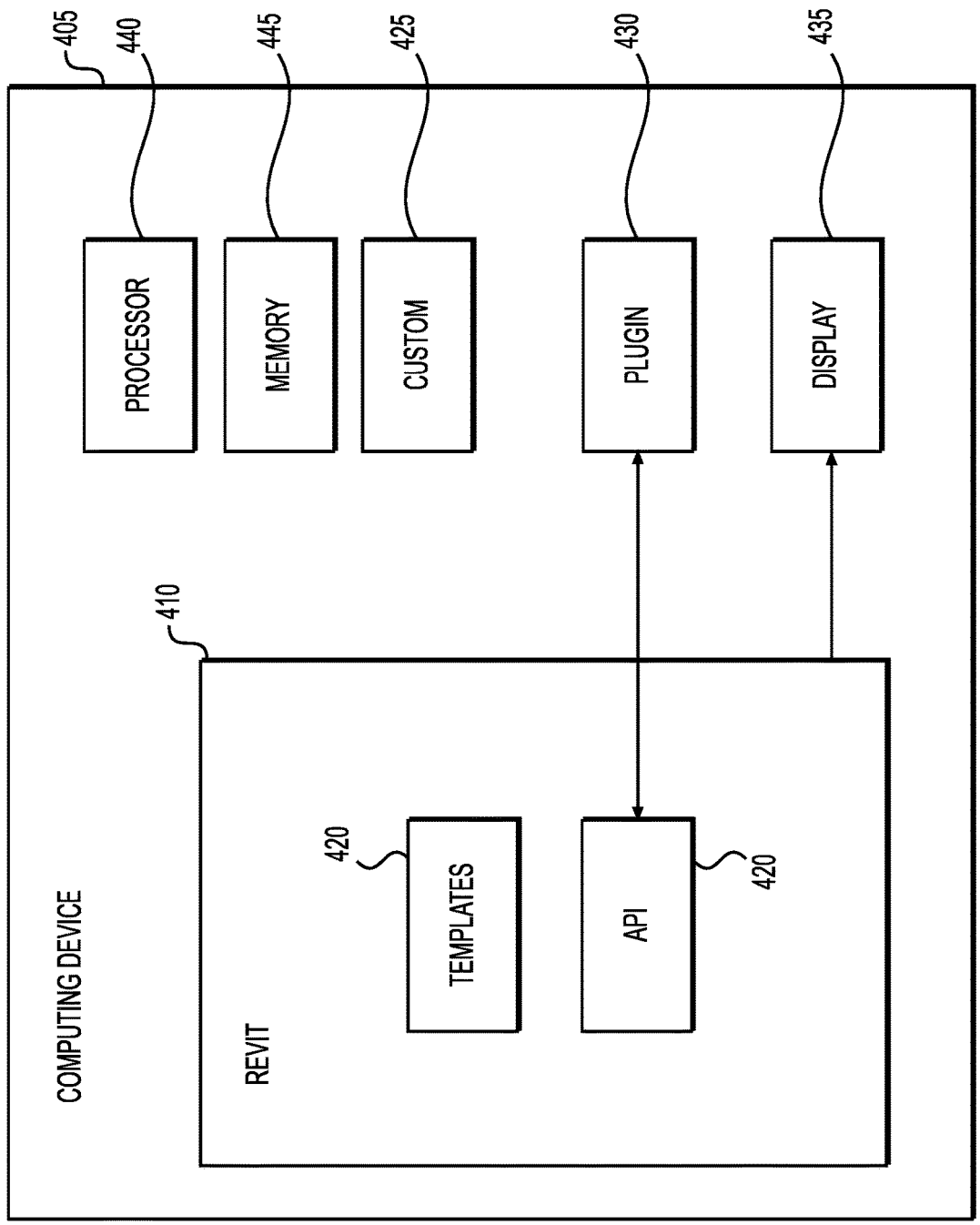
FIG. 4 is an example illustration of system components used for route finding to determine a spool.

FIG. 4 is an illustration of example system components used in communication between REVIT and the plugin. The plugin 430 communicates with REVIT using the REVIT API 420. This can include implementing methods of the API 420 to divert functionality to the plugin. For example, custom drop-down list items can be added for creating the spool sheet. The functionality for doing so can be carried out, in part, in the plugin 430. The plugin 430 can access spool sheet templates 431. The spool sheet templates 431 can be numerous and selected for particular applications, such as ordering parts or building assemblies in the field. The templates 431 can include configuration information for particular component families (e.g., assemblies). This can mean that different templates are available for different families. The plugin can select a template based on the assembly selected at stage 110, for example.

The plugin 430 can run the route-finding process described with regard to FIGS. 1 and 2 to attempt to determine the parts to include in a spool. These parts can form an assembly that a fabricator may need to assemble as part of a construction project.

The computing device 405 can be any processor-based device, such as a personal computer, workstation, server, phone, or laptop. The computing device 405 can include a processor 440 and memory 445. The processor 440 can be one or more physical processors that are local to the computing device 405 or virtual computer processing units that are accessed remotely. The memory 445 can be non-transitory and can store instructions for execution by the processor 445.

The processor 440 can run a computer-aided design application, such as REVIT 410. REVIT 410 can include templates 415 for parts and part assemblies. These can be generic parts and assemblies. Alternatively, custom parts and assemblies 425 can be utilized.

REVIT 440 can also generate a GUI for use with a display 435. The display 435 can be any type of screen and can be integrated into the computing device 405 or separate from the computing device 405.

REVIT 440 can utilize the plugin 430 to add functionality. The plugin 430 can make API 420 calls to REVIT to integrate itself within the workflow. This can include altering the GUI and providing additional functional items, such as menu items and buttons, for use with the auto-dimensioning. The plugin 430 can receive information, such as part identifiers, from REVIT 410, and send back dimensional information. The plugin 430 can also create a spool sheet, in an example.

In one example, the plugin 430 accesses dimensioning rules 432 to determine which dimensions to display and how to calculate them. The dimensioning rules 432 can be keyed to part or assembly identifiers in an example. A database, either local or remote from the computing device 405, can store the dimensioning rules 432 and be accessed by the plugin 430.

In one example, a dimensioning engine 431 can perform the various stages performed by the plugin. The dimensioning engine 431 can interpret the dimensioning rules 432, measure dimensions, and create a spool sheet with views of the part assembly and various dimensions shown.

Although a plugin is described in some examples, the computer-aided application, such as REVIT, can alternatively build the described functionality directly into the application. The examples can still apply to that scenario as well. Additionally, though REVIT is referred to for convenience, the examples can also function with any other computer-aided design application.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A method for spool run route finding, comprising:
   receiving a selection to create a spool;
   receiving selection of endpoints for the spool on a graphical user interface ("GUI");
   traversing routes from the endpoints along multiple connected parts, wherein the routes are determined by at least:
      retrieving connectors from the endpoints;
      for each connector, determining what parts are connected, including determining if parts connected to the connector also meet part criteria of the spool, wherein parts with a part type that does not meet the criteria are not included as connected parts unless the part type is classified for inclusion by the user;
      for each connected part:
         when the connected part is not one of the endpoints or already in another route, repeating the retrieving connectors step for the connected part and determining additional connected parts; and when the connected part is one of the endpoints or has no connectors, ending the respective route;

when the routes have ended, including the connected parts in an assembly; and generating, on the GUI, a spool sheet that includes the assembly as the spool.

2. The method of claim 1, wherein a plugin classifies whether to include the part type in the spool, including prompting the user regarding whether to include a part type that does not currently meet the part criteria, wherein the part type is encountered during traversing the routes.

3. The method of claim 1, wherein determining what parts are connected includes identifying a part as belonging to a different spool and, as a result, treating the part as not connected to the connector.

4. The method of claim 1, wherein a plugin causes the GUI to receive the selection of endpoints based on a plugin function to determine the spool, wherein the GUI is part of a computer-aided design ("CAD") application that communicates with the plugin, and wherein retrieving connectors from the endpoints is based on an application programming interface ("API") call from the plugin to the CAD application.

5. The method of claim 1, further comprising:
based on the routes ending, determining that a first endpoint cannot connect with another endpoint; and
generating, on the GUI, an error condition that indicates the first endpoint is not connected.

6. The method of claim 5, wherein the first endpoint is not included in the assembly, wherein a second endpoint is included in the assembly, and wherein the second endpoint does connect with another endpoint based on the traversed routes.

7. The method of claim 1, further comprising:
prompting the user to select an additional endpoint on the GUI;
performing the traversing routes step for the additional endpoint, resulting in an additional route that connects to at least one of the ended routes; and
including the additional endpoint and parts within the additional route in the assembly.

8. A non-transitory, computer-readable medium containing instructions for spool run route finding, wherein a processor executes the instructions to perform stages comprising:
receiving a selection to create a spool;
receiving selection of endpoints for the spool on a graphical user interface ("GUI");
traversing routes from the endpoints along multiple connected parts, wherein the routes are determined by at least:
retrieving connectors from the endpoints;
for each connector, determining what parts are connected, including determining if parts connected to the connector also meet part criteria of the spool, wherein parts with a part type that does not meet the criteria are not included as connected parts unless the part type is classified for inclusion by the user;
for each connected part:
when the connected part is not one of the endpoints or already in another route, repeating the retrieving connectors step for the connected part and determining additional connected parts; and
when the connected part is one of the endpoints or has no connectors, ending the respective route;
when the routes have ended, including the connected parts in an assembly; and generating, on the GUI, a spool sheet that includes the assembly as the spool.

9. The non-transitory, computer-readable medium of claim 8, wherein a plugin classifies whether to include the part type in the spool, including prompting the user regarding whether to include a part type that does not currently meet the part criteria, wherein the part type is encountered during traversing the routes.

10. The non-transitory, computer-readable medium of claim 8, wherein determining what parts are connected includes identifying a part as belonging to a different spool and, as a result, treating the part as not connected to the connector.

11. The non-transitory, computer-readable medium of claim 8, wherein a plugin causes the GUI to receive the selection of endpoints based on a plugin function to determine the spool, wherein the GUI is part of a computer-aided design ("CAD") application that communicates with the plugin, and wherein retrieving connectors from the endpoints is based on an application programming interface ("API") call from the plugin to the CAD application.

12. The non-transitory, computer-readable medium of claim 8, the stages further comprising:
based on the routes ending, determining that a first endpoint cannot connect with another endpoint; and
generating, on the GUI, an error condition that indicates the first endpoint is not connected.

13. The non-transitory, computer-readable medium of claim 12, wherein the first endpoint is not included in the assembly, wherein a second endpoint is included in the assembly, and wherein the second endpoint does connect with another endpoint based on the traversed routes.

14. The non-transitory, computer-readable medium of claim 8, the stages further comprising:
prompting the user to select an additional endpoint on the GUI;
performing the traversing routes step for the additional endpoint, resulting in an additional route that connects to at least one of the ended routes; and
including the additional endpoint and parts within the additional route in the assembly.

15. A system for spool run route finding, comprising:
a processor that executes instructions for running a design application having an application programming interface ("API");
a memory that includes code for a plugin, the plugin interacting with the API to cause the processor to perform stages including:
receiving a selection to create a spool;
receiving selection of endpoints for the spool on a graphical user interface ("GUI");
traversing routes from the endpoints along multiple connected parts, wherein the routes are determined by at least:
retrieving connectors from the endpoints;
for each connector, determining what parts are connected, including determining if parts connected to the connector also meet part criteria of the spool, wherein parts with a part type that does not meet the criteria are not included as connected parts unless the part type is classified for inclusion by the user;
for each connected part:
when the connected part is not one of the endpoints or already in another route, repeating the retrieving connectors step for the connected part and determining additional connected parts; and when the connected part is one of the endpoints or has no connectors, ending the respective route;

when the routes have ended, including the connected parts in an assembly; and generating, on the GUI, a spool sheet that includes the assembly as the spool.

16. The system of claim 15, wherein a plugin classifies whether to include a part type in the spool, including prompting the user regarding whether to include a part type that does not currently meet the part criteria, wherein the part type is encountered during traversing the routes.

17. The system of claim 15, wherein determining what parts are connected includes identifying a part as belonging to a different spool and, as a result, treating the part as not connected to the connector.

18. The system of claim 15, wherein a plugin causes the GUI to receive the selection of endpoints based on a plugin function to determine the spool, wherein the GUI is part of a computer-aided design ("CAD") application that communicates with the plugin, and wherein retrieving connectors from the endpoints is based on an application programming interface ("API") call from the plugin to the CAD application.

19. The system of claim 15, the stages further comprising:
based on the routes ending, determining that a first endpoint cannot connect with another endpoint; and
generating, on the GUI, an error condition that indicates the first endpoint is not connected.

20. The system of claim 15, the stages further comprising:
prompting the user to select an additional endpoint on the GUI;
performing the traversing routes step for the additional endpoint, resulting in an additional route that connects to at least one of the ended routes; and
including the additional endpoint and parts within the additional route in the assembly.

* * * * *